No. 773,738. PATENTED NOV. 1, 1904.
E. HEFLIN.
ANIMAL HOLDER.
APPLICATION FILED MAY 8, 1903.
NO MODEL.
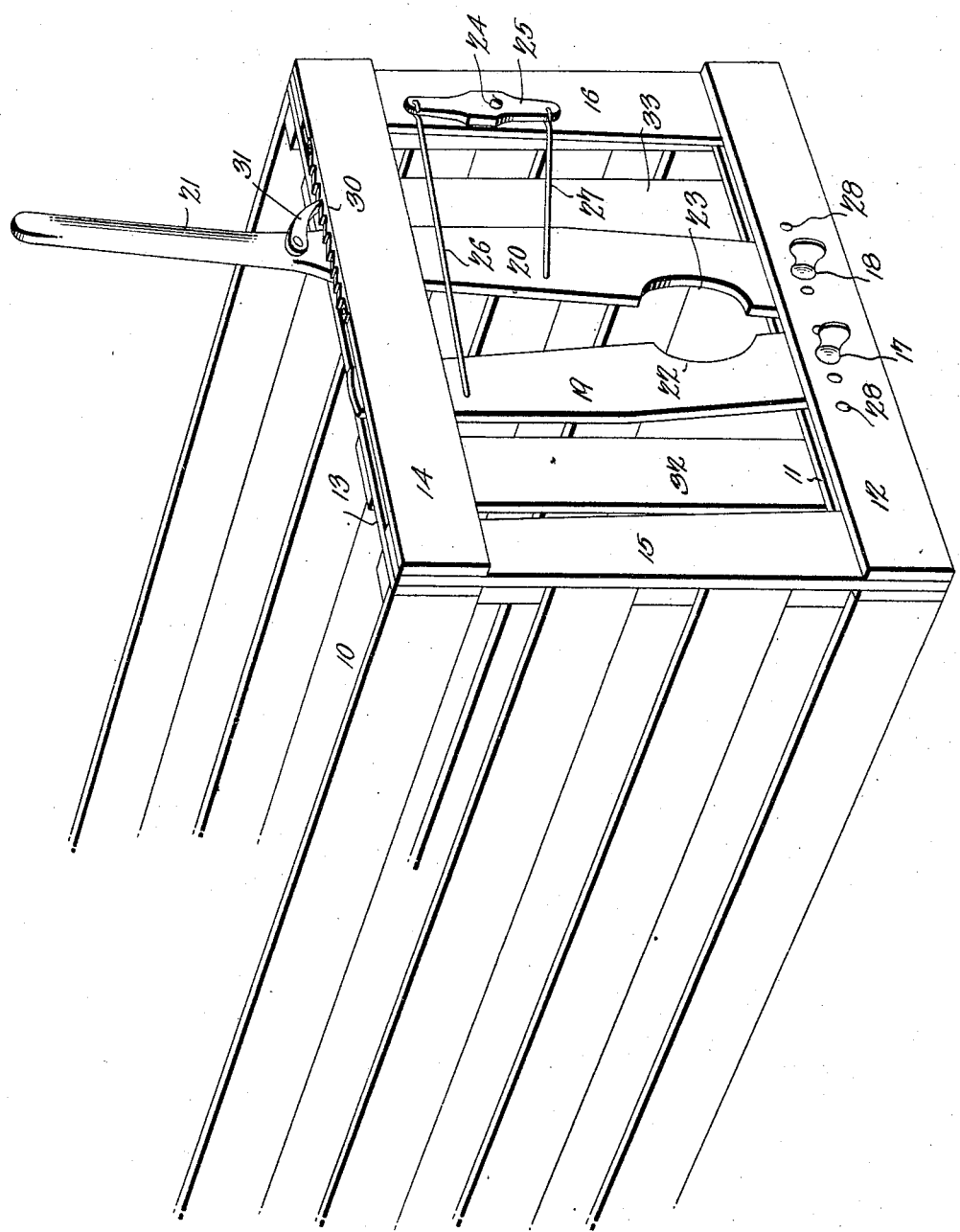
Witnesses
E. F. Stewart
C. N. Woodward
Ellsworth Heflin, Inventor.
by C. A. Snow & Co
Attorneys No. 773,738. Patented November 1, 1904.

UNITED STATES PATENT OFFICE.

ELLSWORTH HEFLIN, OF REDOAK, IOWA.

ANIMAL-HOLDER.

SPECIFICATION forming part of Letters Patent No. 773,738, dated November 1, 1904.

Application filed May 8, 1903. Serial No. 156,224. (No model.)

*To all whom it may concern:*

Be it known that I, ELLSWORTH HEFLIN, a citizen of the United States, residing at Redoak, in the county of Montgomery and State of Iowa, have invented a new and useful Animal-Holder, of which the following is a specification.

This invention relates to that class of devices which are generally known as "hog-traps" and which are used for holding animals securely while being ringed, marked, or otherwise treated.

The present invention has for its object to provide a device of this class which shall be simple in construction, easily manipulated, and effective in operation; and with these and other ends in view the invention consists in the improved construction, arrangement, and combination of parts, which will be hereinafter fully described, and particularly pointed out in the claim.

In the accompanying drawing, in which the single figure represents a perspective view of the invention, I have elected to show a simple and preferred form of the same, with the understanding that changes which properly come under the scope of the invention may be made whenever they may be resorted to without departing from the spirit or sacrificing the utility of the device.

The invention has been illustrated as applied at the end of a chute or runway 10, through which the animals to be operated upon are caused to pass.

The invention comprises a frame consisting of parallel base members 11 and 12, parallel top members 13 and 14, and vertical side members 15 and 16, which are interposed between and serve to space apart the ends of the base members 11 12 and the top members 13 14. Mounted pivotally upon pins 17 18, between the base members 11 12, are a pair of holding-bars 19 20, the upper ends of which are extended between the top members 13 14 of the frame and the latter of which has an upward extension forming a handle 21. The contiguous edges of the holding-bars 19 20 are provided with recesses 22 23, adapted to clamp the neck of the animal which is to be operated upon. A plurality of holes 28 in the base members of the frame provide for adjustment of the pins 17 18 and the consequent adjustment of the holding members 19 20, which may thus be disposed to fit animals of various sizes.

Pivotally connected with the side members 16 of the frame by means of a pin 24 is a rock-lever 25, the upper and lower ends of which are connected, by means of links 26 27, with the holding members 19 and 20, respectively. Upon the upper edge of the front top member 14 of the frame is secured a ratchet-bar 30, engaged by a pawl 31, which is pivotally connected with the handle 21 of the holding member 20.

The operation and advantages of this invention will be readily understood from the foregoing description, taken in connection with the drawing. It will be seen that by manipulating the handle 21 the holding-bars may be drawn forcibly in the direction of each other, so as to clamp the neck of the animal, whose head is caused to protrude beyond the said holding-bars between the recessed portions of the latter. The holding-bars may be retained in locked position by the pawl 31 engaging the ratchet-bar. To release the animal, one or both of the pivotal pins 17 18 may be removed, thus enabling the lower ends of the holding-bars to separate sufficiently to permit the animal to escape from its confinement. The pivotal pins are thereupon restored, care being taken to adjust the holding-bars in a suitable position to fit the animal which is next to be operated upon.

Having thus described my invention, I claim—

In a device of the class described, a frame comprising a pair of base members, a pair of top members, vertical end members interposed between and spacing apart the ends of the front and rear base members and top members, holding members mounted pivotally and adjustably between the front and rear base members extended upwardly between the front and rear top members, one of said holding members having an upwardly-extending handle and a pawl pivotally connected with the latter, a ratchet-bar mounted upon the upper edge of the front top member of the frame and engaging said pawl, a rocking lever connected pivotally with one of the vertical end members of the frame, and links connecting the upper and lower ends of said rocking lever with the holding members.

In testimony that I claim the foregoing as my own I have hereto affixed my signature in the presence of two witnesses.

ELLSWORTH HEFLIN.

Witnesses:
P. P. CLARK,
JOHN C. BRYANT.